United States Patent [19] [11] 4,230,658
Matsukura et al. [45] Oct. 28, 1980

[54] PROCESS FOR PREPARING BIAXIALLY DRAWN THERMOPLASTIC POLYESTER FILM

[75] Inventors: Kazuo Matsukura, Nara; Kunio Murakami, Jyoyo; Tsugio Nagasawa, Uji; Tadashi Hayashi, Uji; Akiyoshi Kozuma, Uji, all of Japan

[73] Assignee: Unitika Limited, Hyogo, Japan

[21] Appl. No.: 24,053

[22] Filed: Mar. 26, 1979

[30] Foreign Application Priority Data

Apr. 17, 1978 [JP] Japan ................................. 53/45763

[51] Int. Cl.$^2$ .............................................. B29C 17/02
[52] U.S. Cl. ................................ 264/235.8; 264/290.2
[58] Field of Search ................... 264/289, 290.2, 235.8

[56] References Cited

U.S. PATENT DOCUMENTS

| 2,823,421 | 2/1958 | Scarlett. | |
|---|---|---|---|
| 2,968,065 | 1/1961 | Gronholz. | |
| 2,968,067 | 1/1961 | Long. | |
| 2,995,779 | 8/1961 | Winter. | |
| 3,107,139 | 10/1963 | Cornforth et al. | |
| 3,432,591 | 3/1969 | Heffelfinger | 264/289 |
| 3,461,199 | 8/1969 | Campbell | 264/289 |
| 3,890,421 | 6/1975 | Habozit | 264/289 |
| 4,042,569 | 8/1977 | Bell et al. | 264/289 |
| 4,110,395 | 8/1978 | Akutin | 264/289 |
| 4,153,667 | 5/1979 | Brady et al. | 264/289 |

FOREIGN PATENT DOCUMENTS 35-11774 8/1960 Japan.
51-80372 7/1976 Japan.

*Primary Examiner*—James B. Lowe
*Attorney, Agent, or Firm*—Oblon, Fisher, Spivak, McClelland & Maier

[57] ABSTRACT

A biaxially drawn thermoplastic polyester film is prepared by concurrent-biaxially drawing a thermoplastic polyester film by a tenter method at a drawing temperature higher than the glass transition temperature of the thermoplastic polyester while maintaining the preheating temperature of the film just prior to drawing at a level greater than the drawing temperature and maintaining the subsequent heat-treating temperature immediately after drawing lower than the preheating temperature and carrying out a reheat-treating process in a plurality of steps while elevating the temperature in each step over a substantially equal temperature range.

10 Claims, No Drawings

4,230,658

PROCESS FOR PREPARING BIAXIALLY DRAWN THERMOPLASTIC POLYESTER FILM

BACKGROUND OF THE INVENTION

1. FIELD OF THE INVENTION

The present invention relates to a technique of reducing the unevenness in a drawn polyester film in the transverse direction of drawn in a technique based up the tenter method.

DESCRIPTION OF THE PRIOR ART

In general, the bowing phenomenon in thermoplastic films is caused by the delay in drawing of the central portion of a film relative to the peripheral areas of the film in a concurrent biaxial drawing of a thermoplastic non-drawn film by a tenter method. The bowing phenomenon results in inequality of the properties of a drawn film in the transverse wise and longitudinal directions of the films especially in the tensile strength, heat-shrinkage and thickness of the film all of which substantially reduce the commercial value of drawn films.

Drawn films of a thermoplastic polyester especially polyethyleneterephthalate, have been widely used in various applications such as in the manufacture of magnetic tapes, capacitors, metallized yarns and food packaging films. Because the bowing phenomenon easily occurs in concurrent biaxial drawing by a tenter method, it is difficult to obtain a film having uniform properties under the conventional drawing temperature conditions. In the manufacture of a magnetic tape or a capacitor, a high quality film is required, which means that it is critical to use a film which is essentially even in the transverse direction of the film.

In general, the drawing method by a tenter mechanism is used in a sequential biaxial drawing and a concurrent biaxial drawing. A polyethyleneterephthalate film has been mainly prepared by the sequential biaxial drawing method. The bowing phenomenon easily occurs under conventional drawing conditions even in the sequential biaxial drawing method. An improved method has been disclosed in Japanese Patent Publication No. 1588/1962. In both sequential and concurrent biaxial drawing the bowing phenomenon is similar. However, the mechanism by which the bowing phenomenon develops in one drawing method is substantially different than the mechanism by which the bowing phenomenon develops in another drawing technique.

That is, in the sequential biaxial drawing method, a non-drawn film is drawn by a set of drawing rolls in a longitudinal direction in the first step and then, both the edges of both sides of the film are clamped with clips and the film is drawn in a transverse direction while the film runs in the longitudinal direction. During the drawing in the transverse direction, slight drawing stress is also generated relative to the longitudinal direction by the transverse drawing stress and the longitudinal drawing stress increases upon approach to the final position for drawing. Because the central part of the film is not substantially supported, the central part is stretched relative to the longitudinal forward direction by the longitudinal drawing stress and is drawn before the peripheral areas of the film. Thus, when the film is fed into the heat-setting zone after the drawing, the drawing stress acts in reverse to delay the forward movement of the central part of the film relative to the peripheral areas of the film in the heat setting process whereby the bowing phenomenon results.

On the other hand, in the concurrent biaxial drawing, the film is drawn not only in the transverse direction but also in the longitudinal direction whereby the longitudinal drawing stress generated by the longitudinal drawing is greater than the stress generated by the transverse drawing. As a result, there is a delay in the drawing of the central part of the film relative to the peripheral areas of the film. This phenomenon is clearly found at the beginning of the drawing and it is released because the drawing stress caused by the transverse drawing increases depending upon the drawing. When the drawing step is finished and the drawn film is fed into the heat setting zone, the contraction stress caused by the drawing is generated in reverse direction to the running direction of the film so that there is a further delay in the heat setting of the central part of the film relative to the peripheral area.

As described above, the bowing mechanism of the concurrent biaxial drawing is different from that of the sequential biaxial drawing. Moreover, the drawing mechanism is substantially different. Therefore, even though the optimum condition for sequential biaxial drawing may be applied to a concurrent biaxial drawing process, stable drawing can not be attained and only a film exhibiting significantly large bowing can be obtained. In concurrent biaxial drawing, optimum drawing conditions must be used which are different from the suitable condition employed in sequential biaxial drawing.

SUMMARY OF THE INVENTION

It is an object of the present invention to prevent the bowing phenomenon during concurrent biaxial drawing in a process for preparing a biaxially drawn thermoplastic polyester film.

The foregoing and other objects of the present invention have been attained by providing a process for preparing a biaxially drawn thermoplastic polyester film by concurrent-biaxially drawing a thermoplastic polyester film by a tenter method which comprises drawing the film at a drawing temperature higher than a glass transition temperature of the thermoplastic polyester while maintaining the temperature during preheating of the film at a level greater than the drawing temperature, and maintaining the temperature of the subsequent heat treatment of the film after drawing at a level less than the preheating temperature and carrying out a reheat-treating process in a plurality of steps while elevating the temperature in each step over a substantially equal temperature range, whereby the bowing phenomenon can be diminished.

DETAILED DESCRIPTION OF THE PREFERRED EMBODIMENTS

In the drawing of a thermoplastic film it is usual to heat the non-drawn film in a preheating zone disposed in front of a drawing zone. The degree of the bowing phenomenon varies depending upon the mutual relation between the preheating temperature and the drawing temperature and can be diminished by maintaining the preheating temperature higher than the drawing temperature. When the preheating temperature is higher than the drawing temperature, the film in the preheating zone is softer than the film in the drawing zone whereby the drawing stress from the drawing zone to the preheating zone is reduced which decreases the delay of the central part of the film. The preheating temperature just before the drawing is preferably not higher than 50° C. over the drawing temperature. If it is higher than 50° C. over the drawing temperature, excess crystallization occurs in the film in the preheating zone which results in deterioration of the drawability of the film and it is easily torn.

The formation of the bowing phenomenon depends upon stress balances between the drawing zone and the preheating zone, and the heat-treating zone. The stress balance can be improved in order to reduce the extent of bowing by maintaining the temperature in the heat treating zone, just after the drawing, at a temperature less than the preheating temperature, preferably less than 50° C. below the preheating zone.

That is, as described above, the bowing phenomenon can be reduced by maintaining the preheating temperature over the drawing temperature. On the other hand, when the preheating temperature is maintained at a temperature higher than the drawing temperature, the self generated heat of the film in the drawing zone elevates the temperature of the film. When such a heated film is fed into the heat-treating zone, the stress balance in the drawing zone and in the heat-treating zone shifts in the direction which amplifies the bowing phenomenon. Therefore, it is necessary to maintain the heat-treating temperature at a temperature less than the preheating temperature, preferably less than 50° C. especially 5° to 30° C. below the preheating temperature but higher than the glass transition temperature of the thermoplastic polyester. If the heat-treating temperature is substantially decreased, the plasticity of the thermoplastic polyester is lost and the bowing phenomenon in the heat-treating zone is not diminished.

A system having a relaxing zone between the drawing zone and the reheating zone has been disclosed in Japanese Patent Publication No. 11774/1960. However, the system is different from the present invention which effects a diminishing in the bowing phenomenon in a film, but its object is to improve crystallinity and it can be applied only in the sequential biaxial drawing process. Moreover, it is quite different from the process of the present invention which is to diminish the bowing phenomenon under the consideration of stress balances between the drawing zone and the zones before and after of the drawing zone in the concurrent biaxial drawing process.

As described above, the bowing phenomenon in the concurrent biaxial drawing process is caused mainly by improper stress balances between the drawing zone and the zones before and after the drawing zone. The inventors have found that the bowing phenomenon can be further diminished in the subsequent reheating zone by reheating the film in a plurality of steps in which the temperature is elevated in each step over substantially equal temperature ranges.

In general, the heat-treating temperature affects the thermal properties of the film especially the heat shrinkage of the heat treated film. Normally a final heat-treatment is conducted on the films at the temperature in the range from the melting point of the resin of the film to a temperature less than 50° C. from the melting point. When the film is transferred from the heat-treating zone following the drawing zone to the final heat-treating zone, the temperature difference at the boundary is remarkably large whereby the film in the central area shrinks in a direction reverse to the forward direction and the bowing phenomenon further increases. The inventors have studies and succeeded in diminishing the bowing phenomenon and decreasing the heat shrinkage by elevating the temperature in each step over a substantially equal temperature range in a plurality of steps which separate the heat treatment of the film immediately after drawing from the final heat-treating temperature. The greater the number of steps in the reheating zones, the better from a process viewpoint. However, satisfactory results can only be realistically obtained for 5 steps or less in practical operations. The equal division of the temperature is preferable however, and similar results can be attained even though about 15° C. of deviation from the central value is present. It is clear that the shrinkage can be reduced by slightly shortening the length of the film during the reheat-treatment.

As described above, the bowing phenomenon is caused by improper stress balances between the drawing zone and the zones before and after the drawing zone and the improper stress balance in the heat-treating zone. The bowing phenomenon can be remarkably diminished by controlling these stress balances by selecting suitable temperature conditions. The inventors have also found by many experiments that the treating time in the preheating zone just before the drawing and the heat-treating zone just after the drawing, highly affect the bowing phenomenon.

The inventors have found that the bowing phenomenon can be further diminished by maintaining the treating time for 0.5 to 20 seconds in the preheating zone just before the drawing and the treating time for 0.2 to 15 seconds in the heat-treating zone just after the drawing. The treating time depends upon the thermal characteristics of the thermoplastic polyester film and the thickness of the film and the response speed for relaxing the film. When the treating time is too short, substantial bowing occurs or the film is fed into the next zone before satisfactory relaxation whereby the desired result can not be obtained. On the other hand, if the treating time is too long, excess crystallization occurs or the bowing phenomenon diminishes and is not continuously performed disadvantageously. In the reheat-treating zone, the time in each step is preferably in the same range as the heat-treating time just after the drawing.

It is necessary to control precisely the extent to which the thickness of the film is reduced. If the thickness of the film just after drawing is less than $4\mu$ in a thermoplastic polyester biaxially drawn film, the extent of bowing is significantly different depending upon the thickness of the film and the draw ratio. Therefore, it is important to control precisely the treating time before and after the drawing zone depending upon the thickness of the film and the draw ratio.

The inventors have studied in various experiments, and have arrived at the following conclusion.

If the thickness of the film after the drawing is less than $4\mu$, the bowing phenomenon can be diminished by giving the treating time $T_1$ (sec.) in the preheating zone just before the drawing as:

$$\frac{t \cdot z}{50} \leq T_1 \leq \frac{2t \cdot z}{3}$$

wherein t represents the thickness ($\mu$) of the film after the drawing, z represents the draw ratio (times); and by giving the treating time $T_2$ (sec.) in the heat-treating zone just after the drawing as:

$$\frac{t \cdot z}{100} \leq T_2 \leq \frac{t \cdot z}{2}$$

The method of diminishing the bowing phenomenon in the tenter method has been disclosed in Japanese Unexamined Patent Publication No. 80372/1976 wherein a film is drawn and is heat-treated at the temperature in a range from the drawing temperature to 50° C. higher than the drawing temperature and then, is cooled below the glass transition temperature and then, is heat-treated at the temperature in a range from the drawing temperature to the melting point.

However in this technique the method of diminishing the bowing phenomenon at the initiation of the drawing is not considered but only the heat-treating step after the drawing is considered. Moreover, the temperature ranges are quite different from those of the present invention. This known process is completely different from the present invention.

The process of the present invention is effective on thermoplastic polyesters especially polyethyleneterephthalate. The biaxially drawn polyester film prepared by the process of the present invention can be used for preparations of magnetic tapes, capacitors, metallized yarns and food packaging films, and has no significant defects in transverse direction at the film which are caused by the bowing phenomenon the film are of excellent quality.

In the process of the present invention, it is possible to use various thermoplastic polyesters such as those of a dicarboxylic acid and a glycol wherein the dicarboxylic acids include terephthalic acid as well as isophthalic acid, adipic acid, sebacic acid, p-$\beta$-oxyethoxybenzoic acid, diphenylsulfonedicarboxylic acid, diphenyl ether dicarboxylic acid and diphenoxyethanedicarboxylic acid and the glycols include ethyleneglycol as well as propyleneglycol, triethyleneglycol, neopentyleneglycol, 1,4-butanediol, 1,4-cyclohexanediol, 1,4-cyclohexanedimethanol, bisphenol A and polyoxyethyleneglycol. It is also possible to use copolyesters or a mixture of polyesters. In the polymerization, suitable catalyst and suitable stabilizers can be used and small amounts of lubricant can be used for preparing the film.

The present invention will be further illustrated by certain examples and references which ae provided for purposes of illustration only and are not intended to be limiting the present invention.

REFERENCE 1

A polyethyleneterephthalate (glass transition temperature of 69° C.) was melted in an extruder at 270° C. and extruded through a T-die on a cooling roll at 70° C. and the extruded film was wound to prepare non-drawn film having a thickness of 120$\mu$. The non-drawn film was drawn by a tenter method in a concurrent biaxially drawing process at a longitudinal elongation ratio of 3 and a transversal elongation ratio of 3.3.

In the drawing step, the temperatures in a preheating zone, the drawing zone and the heat-treating zone just behind the drawing were varied as shown in Table 1. The bowing degrees of the drawn films (value dividing a length of a delay of the film at the center from the edges by a width of the film) are shown in Table 1. In the processes, the temperature in the reheat-treating zone was 220° C. and the treating times in the preheating zone and in the heat-treating zone just after the drawing were respectively 3.0 seconds and 2.4 seconds in all cases.

TABLE 1

| No. | Temperature in preheating zone (°C.) | Temperature in drawing zone (°C.) | Temperature in heat-treating zone (°C.) | Bowing degree |
|---|---|---|---|---|
| 1 | 70 | 80 | 75 | 0.15 |
| 2 | 70 | 80 | 90 | 0.17 |
| 3 | 70 | 80 | 120 | 0.20 |
| 4 | 70 | 80 | 150 | 0.23 |
| 5 | 90 | 80 | 75 | 0.10 |
| 6 | 90 | 80 | 90 | 0.11 |
| 7 | 90 | 80 | 120 | 0.15 |
| 8 | 90 | 80 | 150 | 0.21 |
| 9 | 110 | 85 | 75 | 0.09 |
| 10 | 110 | 85 | 90 | 0.12 |
| 11 | 110 | 85 | 120 | 0.15 |
| 12 | 110 | 85 | 150 | 0.17 |

REFERENCE 2

The non-drawn polyethyleneterephthalate film of Reference 1 was drawn by a tenter method in a concurrent-biaxially drawing process at a longitudinal elongation ratio of 3 and a transversal elongation ratio of 3.3. The temperatures in the preheating zone, the drawing zone, the heat-treating zone just behind the drawing and the reheat-treating zone were varied as shown in Table 2. The treating times in a preheating zone, the drawing zone and the heat-treating zone just behind the drawing were respectively 4 seconds, 1.5 seconds and 3 seconds. The bowing degrees of the drawn films are shown in Table 2.

TABLE 2

| No. | Temperature in preheating zone (°C.) | Temperature in drawing zone (°C.) | Temperature in heat-treating zone (°C.) | Temperature in reheat-treating zone | | | | Bowing degree |
|---|---|---|---|---|---|---|---|---|
| | | | | first step (°C.) | second step (°C.) | third step (°C.) | fourth step (°C.) | |
| 1 | 90 | 80 | 75 | 120 | 120 | 220 | 220 | 0.07 |
| 2 | 90 | 80 | 75 | 150 | 150 | 220 | 220 | 0.05 |
| 3 | 90 | 80 | 75 | 180 | 180 | 220 | 220 | 0.06 |
| 4 | 90 | 80 | 75 | 120 | 120 | 180 | 220 | 0.06 |
| 5 | 90 | 80 | 75 | 120 | 150 | 180 | 220 | 0.05 |
| 6 | 90 | 80 | 75 | 110 | 150 | 180 | 220 | 0.05 |
| 7 | 100 | 90 | 80 | 150 | 150 | 220 | 220 | 0.05 |
| 8 | 100 | 90 | 80 | 110 | 150 | 220 | 220 | 0.04 |
| 9 | 100 | 90 | 80 | 110 | 150 | 180 | 220 | 0.03 |

REFERENCE 3

A polyethyleneterephthalate (glass transition temperature of 69° C.) incorporating 0.2 wt.% of calcium carbonate having an average diameter of 0.1$\mu$, was melted in an extruder at 280° C. and extruded through a T-die on a cooling roll at 80° C. to cast a non-drawn film. In the preparation of the film, the revolutional velocities of the extruder and the cooling roll were varied to obtain three kinds of the non-drawn films having different thickness of 1250μ, 500μ and 90μ. The three kinds of the non-drawn films having different thickness were respectively drawn by a tenter method in a concurrent-biaxially drawing process at a longitudinal elongation ratio of 3 and a transversal elongation ratio of 3.5 under the conditions shown in Table 3. The treating time in each step of the reheat-treating zone was the same with the heat-treating time in the heat-treating zone just behind the drawing.

in an extruder at 280° C. and extruded through a T-die on a cooling roll at 80° C. to cast a non-drawn film having a thickness of 60 μ. The non-drawn film was preheated at 95° C. for 5 seconds and then, it was drawn by a tenter method in a concurrent biaxially drawing process at 80° C. at a longitudinal elongation ratio of 3 and a transversal elongation ratio of 3.3 and then, it was continuously heat-treated in four steps at 75° C., 130° C., 180° C. and 220° C. for each 3.8 seconds.

The bowing degrees of the drawn film and the physical properties of the film at the central part and the edge were measured. The results were excellent as shown in

TABLE 3

| Thickness of non-drawn film | 1250μ | | | 500μ | | | | 90μ | | | | |
|---|---|---|---|---|---|---|---|---|---|---|---|---|
| Preheating zone | | | | | | | | | | | | |
| Temperature (°C.) | 110 | 110 | 110 | 100 | 100 | 100 | 100 | 95 | 95 | 95 | 95 | 95 |
| Time (sec) | 12 | 14 | 16 | 2 | 4 | 10 | 16 | 1.5 | 2 | 4 | 8 | 12 |
| Drawing zone | | | | | | | | | | | | |
| Temperature (°C.) | 90 | 90 | 90 | 90 | 90 | 90 | 90 | 85 | 85 | 85 | 85 | 85 |
| Time (sec) | 4.5 | 5.3 | 6 | 0.8 | 1.5 | 3.8 | 6 | 0.6 | 0.8 | 1.5 | 3 | 4.5 |
| Heat treating zone | | | | | | | | | | | | |
| Temperature (°C.) | 80 | 80 | 80 | 80 | 80 | 80 | 80 | 80 | 80 | 80 | 80 | 80 |
| Time (sec) | 9 | 10.5 | 12 | 1.5 | 3 | 7.5 | 12 | 1.2 | 1.5 | 3 | 6 | 9 |
| Temperature in reheat-treating zone | | | | | | | | | | | | |
| first step (°C.) | 110 | 110 | 110 | 110 | 110 | 110 | 110 | 110 | 110 | 110 | 110 | 110 |
| second step (°C.) | 150 | 150 | 150 | 150 | 150 | 150 | 150 | 150 | 150 | 150 | 150 | 150 |
| third step (°C.) | 180 | 180 | 180 | 180 | 180 | 180 | 180 | 180 | 180 | 180 | 180 | 180 |
| fourth step (°C.) | 220 | 220 | 220 | 220 | 220 | 220 | 220 | 220 | 220 | 220 | 220 | 220 |
| Bowing degree | 0.06 | 0.03 | 0.09 | 0.08 | 0.05 | 0.03 | 0.03 | 0.09 | 0.05 | 0.03 | 0.04 | 0.06 |

REFERENCE 4

A polyethyleneterephthalate (glass transition temperature of 69° C.) incorporating 0.3 wt.% of calcium carbonate having an average diameter of 10 mμ was melted in an extruder at 280° C. and extruded through a T-die on a cooling roll at 80° C. to cast a non-drawn film having a thickness of 30μ. The non-drawn film was drawn by a tenter method in a concurrent-biaxially drawing process. The elongation ratios and the treating times were varied as shown in Table 4. The bowing degrees of the drawn films are shown in Table 4.

Table 5.

TABLE 5

| | Central part | | Edge | |
|---|---|---|---|---|
| | MD | TD | MD | TD |
| Tensile strength (kg/mm$^2$) | 17.5 | 18.4 | 17.3 | 17.6 |
| Elongation (%) | 70 | 70 | 80 | 75 |
| Young modulus (kg/mm$^2$) | 430 | 450 | 420 | 430 |
| Heat shrinkage (%) | 2.1 | 2.5 | 2.1 | 2.2 |
| Bowing degree | 0.03 | | | |

(Shrinkage: measured by heating at 150° C. for 2 hours)

TABLE 4

| Elongation ratio long × trans. | 3 × 2.8 | | | | 3 × 3 | | | | 3 × 3.5 | | | |
|---|---|---|---|---|---|---|---|---|---|---|---|---|
| Preheating zone | | | | | | | | | | | | |
| Temperature (°C.) | 90 | 90 | 90 | 90 | 90 | 90 | 90 | 90 | 90 | 90 | 90 | 90 |
| Time (sec) | 1.5 | 3 | 6 | 10 | 1.5 | 3 | 6 | 10 | 2 | 4 | 8 | 12 |
| Drawing zone | | | | | | | | | | | | |
| Temperature (°C.) | 80 | 80 | 80 | 80 | 80 | 80 | 80 | 80 | 80 | 80 | 80 | 80 |
| Time (sec) | 0.6 | 1.2 | 2.4 | 3.8 | 0.6 | 1.2 | 2.4 | 3.8 | 0.8 | 1.5 | 3 | 4.5 |
| Heat-treating zone | | | | | | | | | | | | |
| Temperature (°C.) | 75 | 75 | 75 | 75 | 75 | 75 | 75 | 75 | 75 | 75 | 75 | 75 |
| Time (sec) | 1.2 | 2.4 | 4.8 | 7.5 | 1.2 | 2.4 | 4.8 | 7.5 | 1.5 | 3 | 6 | 9 |
| Reheat-treating zone | | | | | | | | | | | | |
| first step (°C.) | 100 | 100 | 100 | 100 | 100 | 100 | 100 | 100 | 100 | 100 | 100 | 100 |
| second step (°C.) | 140 | 140 | 140 | 140 | 140 | 140 | 140 | 140 | 140 | 140 | 140 | 140 |
| third step (°C.) | 180 | 180 | 180 | 180 | 180 | 180 | 180 | 180 | 180 | 180 | 180 | 180 |
| fourth step (°C.) | 220 | 220 | 220 | 220 | 220 | 220 | 220 | 220 | 220 | 220 | 220 | 220 |
| Thickness of drawn film (μ) | 3.5 | 3.5 | 3.5 | 3.5 | 3.3 | 3.3 | 3.3 | 3.3 | 2.8 | 2.8 | 2.7 | 2.7 |
| Bowing degree | 0.09 | 0.07 | 0.02 | 0.04 | 0.11 | 0.09 | 0.04 | 0.06 | 0.13 | 0.10 | 0.04 | 0.05 |

EXAMPLE 1

A polyethyleneterephthalate (glass transition temperature of 69° C.) incorporating 0.2 wt.% of calcium carbonate having an average diameter of 10 mμ was melted

EXAMPLE 2

A polybutyleneterephthalate (glass transition temperature of 40° C.) was melted in an extruder at 260° C. and extruded through a T-die on a cooling roll at 40° C. to cast a non-drawn film having a thickness of 120 μ. The non-drawn film was preheated at 90° C. for 8 seconds and then, drawn by a tenter method in a concurrent-biaxially drawing process at 85° C. at a longitudinal elongation ratio of 3 and a transversal elongation ratio of 3 and then, it was continuously heat-treated in three steps at 70° C., 130° C. and 190° C. for each 6 seconds.

The bowing degrees of the drawn film and the physical properties of the film at the central part and the edge were measured. The results were excellent as shown in Table 6.

TABLE 6

|  | Central part | | Edge | |
| --- | --- | --- | --- | --- |
|  | MD | TD | MD | TD |
| Tensile strength (kg/mm$^2$) | 19.5 | 19.1 | 20.1 | 19.0 |
| Elongation (%) | 100 | 95 | 95 | 95 |
| Young modulus (kg/mm$^2$) | 200 | 190 | 200 | 200 |
| Bowing degree |  | 0.06 |  |  |

What is claimed is:

1. In a process for preparing a biaxially drawn thermoplastic polyester film by concurrently-biaxially drawing a thermoplastic polyester film by a tenter technique, the improvement comprising the sequential steps of:
   (a) preheating a thermoplastic polyester film in a preheating zone to a temperature higher than the temperature at which the film is to be drawn;
   (b) concurrently biaxially drawing said preheated film at a temperature greater than the glass transition temperature of the polyester;
   (c) heat treating said drawn polyester film in a heat treating zone at a temperature less than the preheating temperature; and
   (d) progressively heating said heat treated film at increasingly higher temperature levels in a plurality of steps in a reheating zone, wherein the increments of temperature increase between progressively higher temperature levels are about the same.

2. The process according to claim 1, wherein the temperature of the pre-heating step is not greater than 50° C. over the drawing temperature.

3. The process according to claim 1, wherein the temperature of the heat treating step just after drawing is less than 50° C. below the preheating temperature and is higher than the glass transition temperature of the thermoplastic polyester.

4. The process according to claim 1, wherein said film is preheated for a period of 0.5 seconds to 20 seconds in a preheating zone and is heat treated in said heat-treating zone for a period of 0.2 seconds to 15 seconds.

5. The process according to claim 1, wherein the thickness of said film is less than 4μ after the drawing step and the treating time $T_1$ (seconds) in the preheating zone is in the range defined by the expression:

$$\frac{t \cdot z}{50} \leq T_1 \leq \frac{2t \cdot z}{3}$$

wherein t represents the thickness (μ) of the film after drawing, z is the elongation ratio and the time $T_2$ (seconds) in the heat-treating zone is within the range of $$\frac{t \cdot z}{100} \leq T_2 \leq \frac{t \cdot z}{2}$$

6. The process according to claim 1, 2, 3, 4 or 5, wherein the thermoplastic polyester is polyethyleneterephthalate.

7. The process according to claim 1, 2, 3, 4 or 5, wherein the thermoplastic polyester is polybutyleneterephthalate.

8. The process according to claim 1, wherein said plurality of steps in said reheating zone number up to five steps.

9. The process according to claim 1, wherein the temperature in the heat treating zone is within the range of 5° C. to 30° C. below said preheating temperature.

10. The process according to claim 1, wherein the deviations between the incremental increases in temperature are no more than 15° C.

* * * * *